(12) United States Patent
Deshpande et al.

(10) Patent No.: US 10,976,730 B2
(45) Date of Patent: Apr. 13, 2021

(54) DEVICE FOR SOUND BASED MONITORING OF MACHINE OPERATIONS AND METHOD FOR OPERATING THE SAME

(71) Applicants: Anand Deshpande, Bangalore (IN); Aniruddha Pant, Pune (IN)

(72) Inventors: Anand Deshpande, Bangalore (IN); Aniruddha Pant, Pune (IN)

( * ) Notice: Subject to any disclaimer, the term of this patent is extended or adjusted under 35 U.S.C. 154(b) by 0 days.

(21) Appl. No.: 16/627,176

(22) PCT Filed: Jul. 11, 2018

(86) PCT No.: PCT/IB2018/055097
§ 371 (c)(1),
(2) Date: Dec. 27, 2019

(87) PCT Pub. No.: WO2019/012437
PCT Pub. Date: Jan. 17, 2019

(65) Prior Publication Data
US 2020/0159201 A1  May 21, 2020

(30) Foreign Application Priority Data

Jul. 13, 2017 (IN) .............................. 201741024830
Jul. 11, 2018 (WO) ................... PCT/IB2018/055097

(51) Int. Cl.
G05B 23/02 (2006.01)
G06N 20/00 (2019.01)
(Continued)

(52) U.S. Cl.
CPC ....... G05B 23/0254 (2013.01); G05B 23/027 (2013.01); G06N 20/00 (2019.01); G08B 21/187 (2013.01); G10L 25/51 (2013.01)

(58) Field of Classification Search
CPC .............. G05B 23/0254; G05B 23/027; G05B 21/187; G06N 20/00; G10L 25/51
See application file for complete search history.

(56) References Cited

U.S. PATENT DOCUMENTS 8,717,188 B2   5/2014  Han et al.
9,223,299 B2  12/2015  Jenkins et al.
(Continued)

OTHER PUBLICATIONS

Jonguk Lee, Heesu Choi, Daihee Park, Yongwha Chung, Hee-Young Kim, and Sukhan Yoon, Fault Detection and Diagnosis of Railway Point Machines by Sound Analysis, https://www.ncbi.nlm.nih.gov/pmc/articles/PMC4851063/.
(Continued)

Primary Examiner — Andrew L Sniezek
(74) Attorney, Agent, or Firm — Jason C. Cameron

(57) ABSTRACT

A device for monitoring an operating condition of a machine is disclosed. The device includes a sound detection device located in proximity to the machine and configured to collect a plurality of sound signals in real-time from the machine. The device also includes a processor electrically coupled to the sound detection device. The processor is configured to acquire one or more predefined sound analytics models associated with the machine. The processor is also configured to analyse the plurality of sound signals based on the one or more predefined sound analytics models. The processor is further configured to identify the operating condition of the machine based on an analysed result and the one or more predefined sound analytics models. The device also includes a sound analytics system which is further configured to update the one or more predefined sound analytics models based on the plurality of sound signals.

13 Claims, 3 Drawing Sheets

(51) Int. Cl.
    *G08B 21/18*     (2006.01)
    *G10L 25/51*     (2013.01)

(56) References Cited

U.S. PATENT DOCUMENTS

| | | |
|---|---|---|
| 9,332,362 B2 | 5/2016 | Cohn et al. |
| 10,316,711 B2 | 6/2019 | Di Nunno |
| 2018/0158288 A1* | 6/2018 | Logan .................... G01S 19/51 |

OTHER PUBLICATIONS

Mario A. Saucedo-Espinosa, Hugo Jair Escalante & Arturo Berrones, Detection of defective embedded bearings by sound analysis: a machine learning approach, https://link.springer.com/article/10.1007/s10845-014-1000-x.

* cited by examiner

DEVICE FOR SOUND BASED MONITORING OF MACHINE OPERATIONS AND METHOD FOR OPERATING THE SAME

This International Application claims priority from a provisional patent application filed in India having Patent Application No. 201741024830, filed on Jul. 13, 2017 and PCT Application filed with the World International Property Organisation WIPO having Patent Application No. PCT/IB2018/055097, filed on Jul. 11, 2018 titled "A DEVICE FOR SOUND BASED MONITORING OF MACHINE OPERATIONS AND METHOD FOR OPERATING THE SAME"

BACKGROUND

Embodiments of a present disclosure relate to sound analytics and more particularly to, a device for sound based monitoring of machine operations and method for operating the same.

In many areas of manufacturing or engineering, trouble-free operation of a plant depends on proper functioning of the machines used in the plant. To avoid irregular interruptions or damage of the machine, faults should be detected in the initial stage as possible or before a failure of the machine may cause a shutdown. In instances, the failure or beginning of failure of any machine may be accompanied by characteristic sounds. The cause of the undesirable sound needs to be identified for the machine to continue machine's serviceable life. Various fault detection techniques, more particularly to fault detection techniques with acoustic monitoring are available to detect the fault in the early stage or before failure.

Traditional systems utilize a variety of sensors which measure a plurality of parameters such as current, voltages, temperatures or pressures of the machine. Such sensors are fixed to the machine to receive the plurality of parameters. However, such system leads to extra efforts of installation, they may interfere with the operation of the machine, and are not removable or portable.

Furthermore, some system utilizes acoustic sensor which may use sound inputs. However, such acoustic sensors are incapable of analysing complex sounds. Further, such sensors are designed for identifying very specific sound signature and their functionality is unchangeable over time.

Furthermore, the available acoustic sensors only use a threshold checking and give an alarm or indication whenever the threshold is crosses. However, such sensors do not provide the in-depth analysis of sound and sometimes leads to ambiguous results.

Furthermore, the available acoustic sensors can only be used to monitor a specific problem with the machines. Such sensors may not be used to monitor overall operations of the machines, and extract statistics about the machine operations as well as machine performance including quality of the operations.

Hence, there is a need for an improved sound monitoring device for a machine to address the aforementioned issues.

BRIEF DESCRIPTION

In accordance with an embodiment of the present disclosure, a device for monitoring sound of a machine is provided. The device includes a sound detection device located in proximity to the machine and configured to collect a plurality of sound signals in real-time from the machine. The device also includes a processor electrically coupled to the sound detection device. The processor is configured to acquire one or more predefined sound analytics models associated with the machine. The processor is also configured to analyse the plurality of sound signals based on the one or more predefined sound analytics models. The processor is further configured to identify an operating condition of the machine based on analysed result and the one or more predefined sound analytics models. The device further includes a sound analytics engine operatively coupled to the processor. The sound analytics system is configured to update the one or more predefined models based on the plurality of sound signals.

In accordance with another embodiment of the present disclosure, a method for operating a sound monitoring device is provided. The method includes collecting, by a sound detection device, a plurality of sound signals in real-time from the machine. The method also includes acquiring, by a processor, one or more predefined sound analytics models associated with the machine. The method further includes analysing, by the processor, the plurality of sound signals based on the one or more predefined sound analytics model. The method further includes identifying, by the processor, an operating condition of the machine based on analysed result and the one or more predefined sound analytics models. The method further includes updating, by a sound analytics system, the one or more sound analytics models based on the plurality of sound signals.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
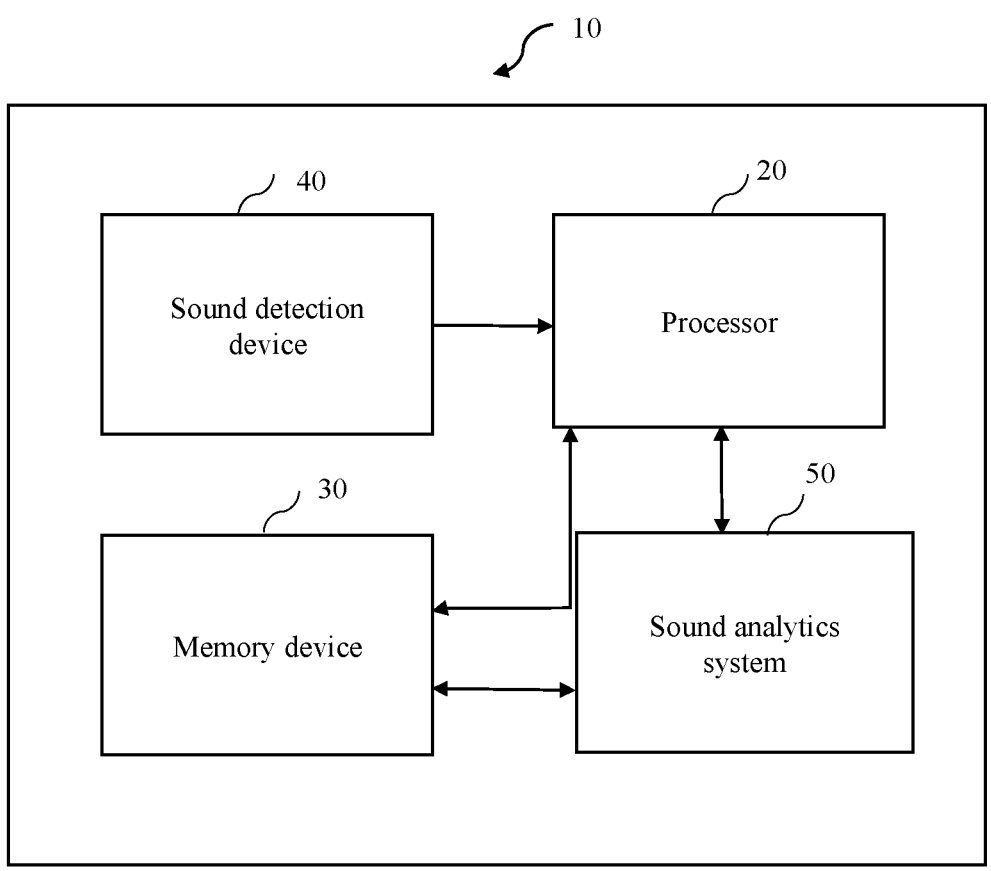
FIG. 1 illustrates a block diagram of a device for sound based monitoring machine operations in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a device for sound based monitoring of machine operations. The device includes a sound detection device located in proximity to the machine and configured to collect a plurality of sound signals in real-time from the machine. The device also includes a processor electrically coupled to the sound detection device. The processor is configured to acquire one or more predefined sound analytics models associated with the machine. The processor is also configured to analyse the plurality of sound signals based on the one or more predefined sound analytics models. The processor is further configured to identify an operating condition of the machine based on analysed result and the one or more predefined sound analytics models. The device further includes a sound analytics engine operatively coupled to the processor. The sound analytics system is further configured to update the one or more sound analytics models based on the plurality of sound signals.

FIG. 1 is a block diagram of a sound monitoring device 10 in accordance with an embodiment of the present disclosure. The device 10 for monitoring sound of a machine is configured to perform edge computing by receiving a plurality of sound signals from the machine. As user herein, the term 'edge computing' refers to a capability of the device 10 to perform local computing within the device and without requiring a connectivity to the servers. As used herein, the term 'sound' includes both audible and inaudible sounds. In other words, 'sounds' includes sounds that are audible to humans, and sounds that are below the human audible range (subsonic) and sounds that are above the human audible range (ultrasonic). In a specific embodiment, the device 10 include a casing configured to enclose sound detection device 40, a processor 20, a sound analytics system 50, a memory device 30 and a plurality of peripheral devices. In one embodiment, the device 10 may include a processor 20, a memory device 30 and a plurality of peripheral devices.

The device 10 also includes a sound detection device 40 located in proximity to the machine. The sound detection device 40 is configured to collect a plurality of sound signals in real-time from the machine. In some embodiment, the sound detection device 40 may include a microphone. In such embodiment, the sound detection device 40 may be located outside the casing. In another embodiment, at least one of one or more sound detection devices 40 may be located inside the casing. The sound detection device 40 is also configured to convert the plurality of sounds in the plurality of electrical signals.

Furthermore, the device 10 also includes the processor 20 electrically coupled to the sound detection device 40. The processor 20 is configured to receive the plurality of electrical signals from the sound detection device 40 and store the plurality electrical signals in the memory device 30. The processor 20 is also configured to acquire one or more predefined sound analytics models associated with the machine. The processor 20 is also configured to analyse the plurality of electrical signals based on the one or more predefined sound analytics models. In one embodiment, the one or more predefined sound analytics models may include a plurality of machine learning models. In some embodiments, the one or more predefined sound analytics models may be stored in the memory device 30. The processor 20 is further configured to identify the operating condition of the machine based on an analysed result and the one or more predefined sound analytics models. In a specific embodiment, the processor 20 is further configured to identify one or more faults of the machine based on an analysed result and the one or more predefined sound analytics models.

The device 10 further includes a sound analytics system 50 operatively coupled to the processor 20. The sound analytics system 50 is configured to update the one or more predefined sound analytics models based on the plurality of sound signals. In one embodiment, the sound analytics system 50 may receive the plurality of sound signals and learns from the plurality of sound signals continuously for detecting one or more faults in the future. In another embodiment, the sound analytics system 50 learns from the plurality of sound signals by adding an updated model from an external source, where the updated model from the external source are obtained based on a plurality of experiments performed on the machine in a plurality of situations. The one or more predefined sound analytics models are updated by identifying a plurality of classes of the plurality of sounds based on the analysed result. In a specific embodiment, the one or more predefined sound analytics models may be trained to identify and classify the plurality of sound signals in real-time, to infer operational information about the machine, as well as information about the quality of the operation and the health of the machine.

In some embodiments, the sound analytics engine 50 is further configured to send a real time notification to an external computing device upon detecting the one or more faults. In such embodiment, the real time notification may include, a graphic, a vibration, a short message service (SMS) message or an alarm sound. In a specific embodiment, the external computing device includes a mobile phone, a tablet, a laptop or a computer.

Figure 2:
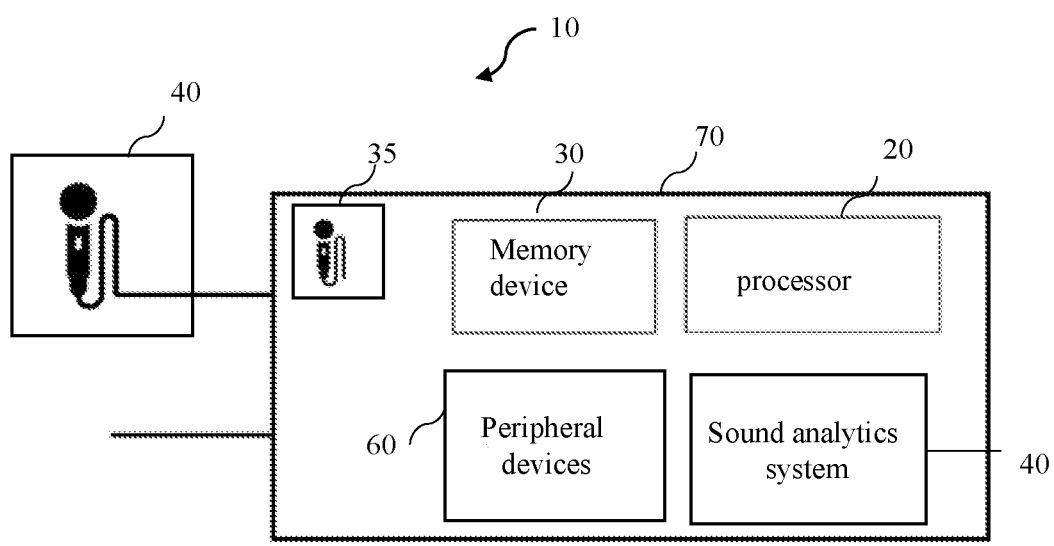
FIG. 2 illustrates a block diagram of an exemplary sound monitoring device of FIG. 1 in accordance with an embodiment of the present disclosure.

FIG. 2 is a block diagram of an exemplary sound monitoring device 10 of FIG. 1 in accordance with an embodiment of the present disclosure. The device 10 is configured to detect and analyse the sound from a machine. In one embodiment, the machine may include one or more machine of a manufacturing plant, one or more air and gas pipeline or a vehicle. The device 10 includes a sound detection device 40, a sound analytics engine 50, a memory device 30, a processor 20 and a plurality of peripheral devices 60. The sound detection device 40 is located in proximity to the machine. The sound detection device 40 is configured to collect a plurality of sound signals in real-time from the machine. In some embodiment, the sound detection device 40 may include a microphone. In such embodiment, the sound detection device 40 may be a portable sound detection device and located outside a casing 70. In another embodiment, at least one 35 of one or more sound detection devices 40 may be located inside the casing 70. The sound detection device 40 is further configured to generate digital data files including electrical impulses as sound data.

Furthermore, the processor 20 of the device 10 is configured to receive the electrical impulses from the sound detection device 40 and store the electrical impulses in the memory device 30. The processor 20 is also configured to acquire one or more predefined sound analytics models associated with the machine. The one or more predefined sound analytics models are machine learning models trained on a plurality of extensive sound signals data collected previously. The machine learning models are trained on the plurality of sound signals about the one or more faults in the machine, as well as an operating condition of the machine. In other words, a series of numerous experiments or field tests are performed on each device 10 to record the sounds of various fault and predictive fault conditions. The automatic troubleshooting using these one or more predefined sound analytics models may be refined based upon the experience and knowledge of expert technicians. Such one or more predefined sound analytics models may be embedded and associated in the memory device 30.

The processor 20 is also configured to analyse the plurality of electrical signals based on the one or more predefined sound analytics models. A plurality of diagnostic algorithms identifies and classify the plurality of sound signals using one or more predefined sound analytics models to draw conclusions regarding the existence of one or more current or future problem condition and also draws statistics about operating condition of the machine. The processor 20 is further configured to identify one or more faults of the machine based on an analysed result and one or more predefined sound analytics models. In some embodiments, the processor 20 may also be configured to calculate a plurality of operational patterns of the machine and calculate a plurality of operation statistics such as efficiency and performance of the machine. In an exemplary embodiment, the processor 20 detects leakage of air or gas from a compressed air or gas pipeline or machinery using the leakage sound as the input. In another exemplary embodiment, the processor 20 is also configured to identify the plurality of sounds from a moving or stationary vehicle and generate intelligence about the health of the vehicle and the subsystems therein and predictive maintenance of the vehicle.

The sound analytics system 50 of the device 10 is further configured to update the one or more learning models based on the plurality of sound signals. In one embodiment, the sound analytics system 50 receives the plurality of sound signals from the machine and learn continuously from the plurality of sound signals and identify the one or more faults in the machine when such type of sound signals is received in the future. The sound analytic engine 50 further updates the one or more learning models with one or more parameters such as health of the machine, predictive maintenance of the machine and tracking the operations of the machine. In some embodiments, the sound analytics engine 50 is further configured to send a real time notification to an external computing device upon detecting the one or more faults.

Figure 3:
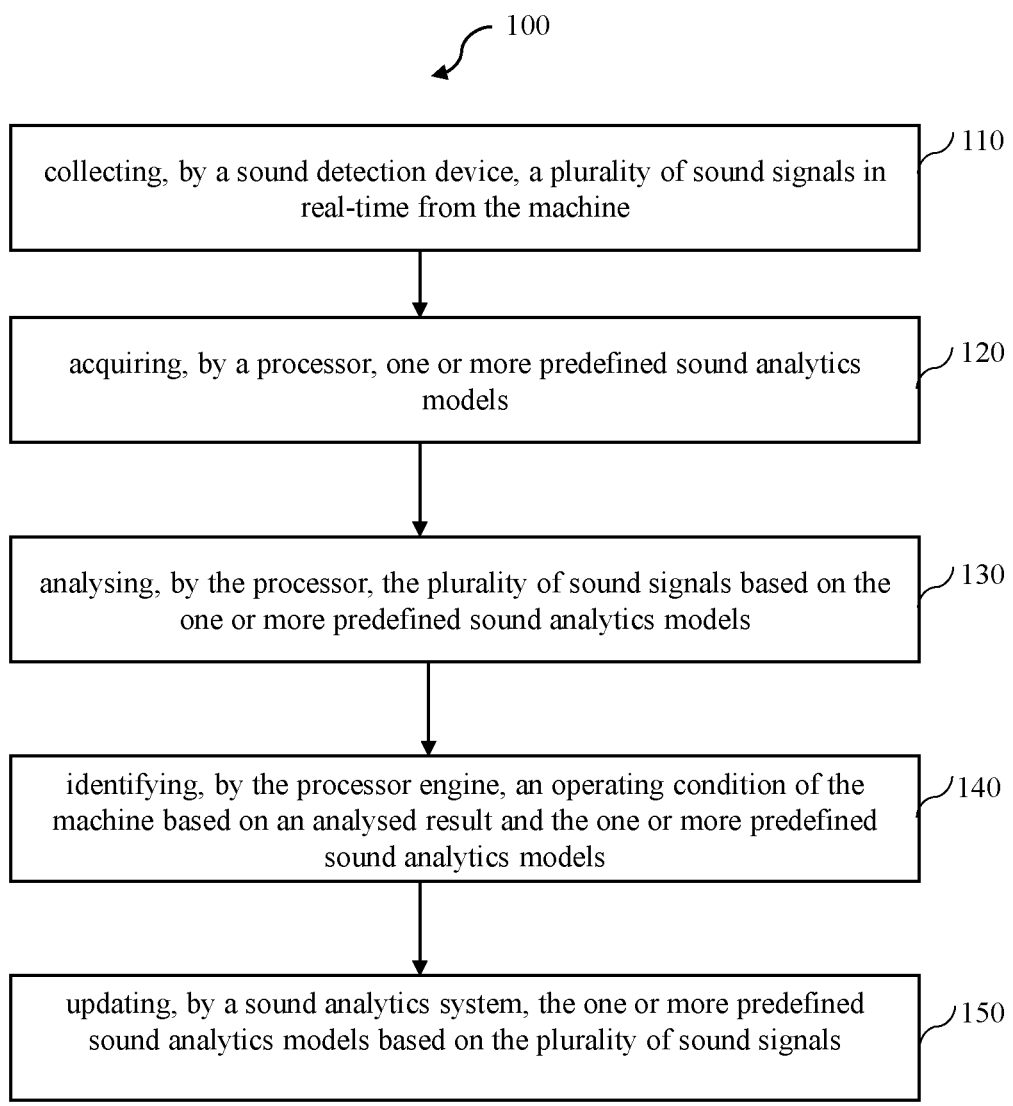
FIG. 3 illustrates a flow chart representing the steps involved in a method for operating the sound monitoring device of FIG. 1 in accordance with an embodiment of the present disclosure.

FIG. 3 illustrates a flow chart representing the steps involved in a method 100 for operating the sound monitoring device of FIG. 1 in accordance with an embodiment of the present disclosure. The method 100 includes collecting, by a sound detection device, a plurality of sound signals in real-time from the machine in step 110. In one embodiment, collecting, by a microphone, a plurality of sound signals in real-time from the machine. In some embodiment, the method 100 may include converting the plurality of sounds in the plurality of electrical signals.

The method 100 also includes acquiring, by a processor, one or more predefined sound analytics models associated with the machine in step 120. In one embodiment, the method 100 may include receiving the plurality of electrical signals from the sound detection device and store the plurality electrical signals in the memory device. The method 100 further includes analysing the plurality of electrical signals based on the one or more predefined sound analytics models in step 130.

The method 100 further includes identifying, by the processor, an operating condition of the machine based on an analysed result and the one or more predefined sound analytics models in step 140. In one embodiment, identifying, by the processor, the operating condition of the machine based on the analysed result and the one or more predefined sound analytics models may include identifying one or more faults of the machine. In such embodiment, identifying, by the sound analytics engine, the one or more faults in the machine based on the analysed result and the one or more predefined sound analytics models may include identifying a plurality of classes of the plurality of sounds based on the analysed result. The method 100 further includes update the one or more predefined sound analytics models based on the plurality of sound signals in step 150. In some embodiments, updating, by the sound analytics engine, the one or more predefined sound analytics models based on the plurality of sound signals may include updating the one or more predefined sound analytics models upon calculating one or more operational patterns and one or more operational statistics of the machine. In a preferred embodiment, the method 100 may include sending a real time notification to an external computing device upon detecting the one or more faults.

Various embodiments of the sound monitoring device described above enable a standalone, independent, and complete product which listens to the plurality of sounds and generates intelligence from the plurality of sounds. The device has the necessary computational resources required to carry out the computation. In carrying out these computations, there is no dependency whatsoever on any external computation resources as compared to conventional devices.

Furthermore, the device for sound monitoring uses sound as the primary input which means the device is a non-intrusive. The device is very easy to install and deploy for a variety of applications because of non-touch method.

Moreover, the device has ability to learn the sound signatures over time and the parameters of learning model may be adjusted. This means the device may be used to detect a variety of sound signatures, and the usage of the device may be changed over time.

It will be understood by those skilled in the art that the foregoing general description and the following detailed description are exemplary and explanatory of the disclosure and are not intended to be restrictive thereof.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A device for monitoring an operating condition of a machine comprising:
   a sound detection device located in proximity to the machine and configured to collect a plurality of sound signals in real-time from the machine;
   a processor electrically coupled to the sound detection device and configured to:
      acquire one or more predefined sound analytics models associated with the machine;
      analyse the plurality of sound signals based on the one or more predefined sound analytics models;
      identify the operating condition of the machine based on an analysed result and the one or more predefined sound analytics models;
   a sound analytics system operatively coupled to the processor and configured to update the one or more predefined sound analytics models based on the plurality of sound signals, wherein updating one or more predefined sound analytics models comprises updating one or more learning models based on the plurality of sound signals upon calculating one or more operational patterns and one or more operational statistics of the machine.

2. The device as claimed in claim 1, wherein the sound detection device comprises a microphone.

3. The device as claimed in claim 1, wherein the sound analytics system is further configured to send a real time notification to an external computing device upon detecting one or more faults.

4. The device is claimed in claim 3, wherein the real time notification comprises, a graphic, a vibration, a short message service (SMS) message or an alarm sound.

5. The device as claimed in claim 3, wherein the external computing device comprises a mobile phone, a tablet, a laptop or a computer.

6. The device as claimed in claim 1, further comprising a memory device and a plurality of peripheral devices.

7. The device as claimed in claim 1, further comprising a casing configured to house the sound detection device, the processor, the sound analytics system, a memory and a plurality of peripheral devices.

8. The device is claimed in claim 7, wherein the sound detection device is located outside the casing.

9. The device is claimed in claim 1, wherein the sound analytics system is further configured to learn from the plurality of sound signals by adding an updated model from an external source.

10. A method comprising:
    collecting, by a sound detection device, a plurality of sound signals in real-time from a machine;
    acquiring, by a process, one or more predefined sound analytics models associated with the machine;
    analysing, by the processor, the plurality of sound signals based on the one or more predefined sound analytics models;
    identifying, by the processor, an operating condition of the machine based on an analysed result and the one or more predefined sound analytics models;
    updating, by a sound analytics system, the one or more predefined sound analytics models based on the plurality of sound signals, wherein updating one or more predefined sound analytics models comprises updating one or more learning models based on the plurality of sound signals upon calculating one or more operational patterns and one or more operational statistics of the machine.

11. The method as claimed in claim 10, wherein identifying, by the processor, the operating condition of the machine based on the analysed result and the one or more predefined sound analytics models comprises identifying one or more faults of the machine.

12. The method as claimed in claim 11, wherein identifying, by the processor, the one or more faults in the machine comprises identifying a plurality of classes of the plurality of sounds based on the analysed result.

13. The method as claimed in claim 10, further comprising sending a real time notification to an external computing device upon detecting the one or more faults.

* * * * *